Patented Feb. 12, 1935

1,991,269

UNITED STATES PATENT OFFICE 1,991,269

PROCESS OF EXTRACTING METALS FROM BERYLLIUM MINERALS

Harry Howard Armstrong, Los Angeles, Calif.

No Drawing. Application July 25, 1932,
Serial No. 624,662

5 Claims. (Cl. 23—16)

This invention relates to the extraction of metals from ores and particularly certain silicate ores like beryl now considered very difficult and complex in their treatment. This application is a continuation-in-part of my pending application Serial No. 557,737 filed August 17, 1931.

The usual method of dealing with many complex and silicate ores on a commercial scale is to fuse or roast the ground or pulverized ore with an excess of sodium and potassium carbonates or either one. The quantity used of these materials is usually from one to six times the weight of the ore. This procedure is well known in metallurgy and is used and recommended for silicates which are called undecomposable in mineral acids. These include the beryls, feldspars, micas and the artificial materials such as glass, porcelain, etc. The effect of fusion is to increase the proportion of base in the silicate and increase the solubility so that the silicate is "opened up" and is usually made decomposable by acid. Usually the excess of alkali in a fused silicate can be partially dissolved out by hot water leaching. This fusion method is usually applied to silicate ores carrying values sufficient to warrant the use of so much alkali and subsequent necessary acid.

In many cases, however, the use of one to six parts of alkali carbonates, to one part of the ore, places the operation in such an expensive class that this treatment cannot be considered and some other method must be used or the ore, or material, is not commercially treatable at all, due to the excessive costs. These fusions also demand the subsequent use of a large volume of acid and, consequently, a very large volume of by-products must be recovered in order to render them at all economical and in most cases the by-product in large quantities is not marketable due to low value, sales and transportation costs and lack of demand.

In my process I recover substantially all of the base metals very economically by a minimum use of reagents which enables me to treat materials hitherto commercially non-treatable due to their excessive treating costs. Also, the by-products are recovered economically in a much more condensed and marketable form and condition. It also enables me to produce metals and alloys more economically for the same reason.

I now describe the treatment of beryllium ore, beryl, as an example:

The first step of my process comprises grinding the ore to a suitable degree of fineness. The beryl, which ordinarily contains 10% to 13% BeO and 13% to 18% $Al_2O_3$, 69% to 70% $SiO_2$ and traces of iron oxide, is always ground to minus 80 mesh, and to save time is frequently ground to minus 125 mesh. I mix a comparatively small amount of sodium carbonate (anhydrous) or other alkali or neutral salt such as NaF, NaCl, $CaCl_2$ or $CaB_6$ with the ground beryl and roast or fuse the mixed material sufficiently to partially "open up" the silicate in the known manner. By so doing, I find that the roasted or fused material is in a condition to be readily decomposed by a strong mineral acid under pressure and heat. I use just sufficient acid, as demanded by theory, usually strong $H_2SO_4$ of 60° to 66° Bé., to decompose and render soluble the bases. In the case of beryl which usually carries 10% to 12% BeO and 15% to 18% $Al_2O_3$, I find that the amount of alkali carbonate never has to exceed one-half part of the alkali to one part, by weight, of beryl ore, and usually one-fifth is ample. I then add the strong acid, say $H_2SO_4$, HCl or $HNO_3$, thoroughly mix it with the fused material, which may or may not have been leached with water to remove some alkali, and place the mixture in a closed vessel. Heat and pressure, either internal or external, is applied until the acid has thoroughly decomposed the material and has turned the BeO and $Al_2O_3$ contents into soluble salts of the strong acid. The minimum is 10 pounds per square inch at 212° F., but higher pressures and temperatures shorten the treatment. The salts are very soluble in water and the silica residue is not in a jelly or semi-colloidal condition but is in a fine powder that is easily removed by filtration, and finds a ready market.

The filtrate liquor carrying the dissolved beryllium and aluminum salts and a trace of iron is then treated with an excess of an alkali such as NaOH, which precipitates the iron and keeps the beryllium and aluminum in solution. On diluting and heating this liquor, the $Be(OH)_2$ may be precipitated as described in chemical books generally. But by heating the strong solution above atmospheric pressure, a precipitation of dense beryllium hydroxide takes place unlike any precipitation from dilute solutions and this precipitation under pressure is a distinctive part of my invention. I carry out this step by heating the solution in a closed vessel until it generates its own pressure of about 50 pounds per square inch. Under these conditions the $Be(OH)_2$ precipitates in about ten minutes. Higher pressures may be used and also those as low as 10 pounds per square inch, but prolonged treatment is necessary in this latter case.

The pressure precipitation from the strong solution of concentrate is preferable in every way to the precipitate from any dilute solution. It forms in a very much shorter time and saves the heating of a large and unnecessary quantity of water, as well as the evaporation of the large volume of liquor in order to recover, economically, the aluminum hydroxide and the by-product of sodium sulphate. The $Al(OH)_3$ is recovered by neutralizing the liquor with acid, say $H_2SO_4$, after the $Be(OH)_2$ has been removed, and precipitating the aluminum with a suitable alkali reagent, say NaOH. Evaporation recovers the $Na_2SO_4$ in the usual commercial manner, if $H_2SO_4$ was used in the digestion and precipitation steps.

I have found that the reduction of my dense beryllium hydroxide to metal may be carried out at a much lower temperature and the metal is in shape to be remelted into a very dense, useful form. Also, the alloys of beryllium and other metals are formed much more readily and of a denser structure when this dense beryllium hydroxide is used with the other metallic components of the alloy.

While I have described in these examples the application of the process to beryl ores, these being silicates I do not limit myself, however, to the treatment of silicates for the reason that the process is very much broader and covers the economical treatment of many complex and hitherto difficultly treatable naturally occurring beryllium combinations. The only requirement is that they be attackable at high temperatures by alkali metal carbonates. It is believed that all known natural beryllium combinations may be so "opened up".

I claim as my invention:

1. The process of precipitating beryllium hydroxide from an alkaline aqueous solution containing beryllium associated with the negative radicals of strong mineral acids which comprises alkalinizing said solution with an alkali-metal hydroxide; heating such solution in a closed space until a minimum pressure of 10 pounds per square inch above atmospheric pressure has been held until a copious precipitate of beryllium hydroxide is produced.

2. The process of extracting beryllium from beryl which comprises finely grinding the crude beryl, mixing therewith a minimum of one-fifth to a maximum of one-half of the weight of the mineral in anhydrous sodium carbonate, then fusing until substantial reaction takes place, cooling, digesting the resultant mass with sulfuric acid under at least 10 pounds per square inch of pressure above that of the atmosphere and 212° F. until the beryllium has been substantially converted into a salt of the acid used; then leaching the mass with water, adding NaOH to alkalinity and heating the resultant solution under 10 pounds or greater pressure until beryllium is substantially entirely precipitated as hydroxide.

3. The process of extracting beryllium from metals containing it which comprises grinding the mineral, mixing it with an alkali-earth-metal-containing-neutral-salt, heating the mixture to the reacting point, digesting the resultant mass at least 212° F. with a strong mineral acid under a pressure at least 10 lbs. per square inch greater than atmospheric, leaching the resultant mass with water, alkalinizing the water extract with NaOH, removing the iron hydroxide precipitated by the alkalinizing step and then precipitating beryllium hydroxide from the remainder of the extract by heating said extract under 50 lbs. per square inch pressure under conditions where this pressure is generated by the amount of heat supplied.

4. The process which comprises fusing a beryllium containing mineral with one-fifth to one-half parts by weight of an alkali-metal carbonate to one part of the mineral, then adding sufficient concentrated mineral acid to neutralize the residual alkali and to render the metallic bases soluble; heating this mixture at a minimum of 10 lbs. per square inch above atmospheric pressure and 212° F. until the BeO content has been substantially converted into a water soluble salt of the added acid then leaching out said soluble salt with water, heating the said solution in the presence of an alkali-metal hydroxide in a closed space until a minimum pressure of 10 lbs. per square inch above atmospheric pressure is reached and holding the solution in such state until a precipitate of dense beryllium hydroxide is produced.

5. The proces of extracting beryllium from minerals containing it which comprises finely grinding the crude mineral, then mixing it with an alkali-metal carbonate, heating the mixture at least to the fusion point of the carbonate, digesting the resultant mass with a strong mineral acid under pressure greater than atmospheric, leaching the resultant mass with water alkalinizing the water extract with NaOH, removing the iron hydroxide precipitated by the alkalinizing step and then precipitating the beryllium hydroxide from the remainder of the extract by heating the latter to a pressure of 50 lbs. per square inch for at least 10 minutes.

HARRY H. ARMSTRONG.